No. 777,679.

Patented December 20, 1904.

UNITED STATES PATENT OFFICE.

CHARLES THOMAS KINGZETT, OF CHISLEHURST, ENGLAND.

MANUFACTURE OF GOLF-BALLS.

SPECIFICATION forming part of Letters Patent No. 777,679, dated December 20, 1904.

Application filed February 9, 1904. Serial No. 192,808.

*To all whom it may concern:*

Be it known that I, CHARLES THOMAS KINGZETT, chemical manufacturer, a subject of the King of Great Britain, residing at Elmstead Knoll, Chislehurst, in the county of Kent, England, have invented certain new and useful Improvements in the Manufacture of Golf-Balls, of which the following is a specification.

In the specification of a previous patent granted to me, No. 734,888, I have described the manufacture of the inner portion of golf-balls wholly or partly from non-vulcanized thin sheet-rubber softened by previous immersion in a volatilizable solvent, the thin sheet-rubber when so softened and brought into a plastic state being distended and wound tightly in numerous layers around a small nucleus, the successive folds then adhering closely together and forming a compact dense mass of practically solid character, an outer envelop of gutta-percha or equivalent material being employed, as usual. I have found that I can obtain an equal or better result if the preliminary softening of the non-vulcanized sheet-rubber and the bringing it into a plastic state are effected by the application of heat instead of solvent. When sufficiently heated, the sheet-rubber becomes so softened that it can be stretched to many times its original length and when in this extended heated state can be pressed by the thumb and fingers into very close contact with the nucleus around which it is being wound by hand, or the winding may be done mechanically, and in this way a dense and very hard sphere of pure rubber can readily be produced. The softening of the sheet-rubber can readily be effected by laying it onto a heated metallic plate. A portion of the rubber so prepared may be rolled and pressed together to form a small central nucleus around which the remainder of the rubber softened by heat can then be wound, as above described, or the central nucleus around which the prepared sheet-rubber is wound may be of other material. It may, for example, be a metallic ball—say about one-fourth inch in diameter—or it may be a sphere of cork having a small ball of lead or steel or glass or other material inserted into its center, or it may be otherwise formed in any suitable manner.

The whole of the inner portion of a golf-ball may be formed in the above manner and be then inclosed in an outer envelop of gutta-percha or other suitable material of about one-eighth of an inch in thickness (more or less) in any desired manner, or a portion only may be so formed and the remainder formed in other ways.

In some cases the solid rubber may be built up in the above way in concentric layers separated one from the other by layers of other material—as, for example, I in some cases form it in two such layers, an inner sphere of solid rubber being first formed in the above way and this sphere then inclosed within two half-spheres of xylonite, either perforated or unperforated, and afterward an outer layer of solid rubber then formed in the same way around the exterior of the xylonite.

In some cases the softening of the thin sheet-rubber before stretching and winding it up into a spherical ball may be effected partly by solvent, as in my former patent, and partly by heat, as above described.

What I claim is—

1. The hereinbefore-described process of forming a ball having a spherical inner portion of dense but very elastic india-rubber such process consisting in heating strips of thin sheet-rubber to soften them and bring them into a state in which they can be stretched to many times their original length, then extending and winding up such strips around a central nucleus into a spherical mass and subsequently inclosing such spherical mass in an outer casing of gutta-percha or equivalent material.

2. The hereinbefore-described process of forming a spherical layer of solid india-rubber around a central nucleus such process consisting in heating strips of thin sheet-rubber to soften them and bring them into a state in which they can be stretched to many times their original length, then extending and winding up such strips into a spherical mass until the required thickness of layer is obtained with all the several turns and folds of this winding adhering together and forming one compact mass.

3. The hereinbefore-described process of forming a ball such process consisting in heating strips of thin sheet-rubber to soften them and bring them into a state in which they can be stretched to many times their own length, then extending and winding up such strips around a central nucleus into a spherical mass then inclosing such spherical mass within a layer of other material, then forming in the same way another spherical layer of solid rubber around this material and finally inclosing the spherical mass formed in this way within an outer casing of gutta-percha or equivalent material.

4. The hereinbefore-described process of forming a ball such process consisting in first softening strips of thin sheet-rubber by heat aided by the application of a volatile solvent then extending and winding up such strips around a central nucleus into a spherical mass and subsequently inclosing such spherical mass in an outer casing of gutta-percha or equivalent material.

CHARLES THOMAS KINGZETT.

Witnesses:
H. D. JAMESON,
A. NUTTING.